(12) United States Patent
Losaw (10) Patent No.: US 11,011,897 B2
(45) Date of Patent: May 18, 2021

(54) SELECTIVELY ADJUSTABLE JUNCTION BOX

(71) Applicant: Monte R. Losaw, Littleton, CO (US)

(72) Inventor: Monte R. Losaw, Littleton, CO (US)

( * ) Notice: Subject to any disclaimer, the term of this patent is extended or adjusted under 35 U.S.C. 154(b) by 0 days.

(21) Appl. No.: 16/986,976

(22) Filed: Aug. 6, 2020

(65) Prior Publication Data

US 2020/0366072 A1 Nov. 19, 2020

Related U.S. Application Data

(62) Division of application No. 16/405,292, filed on May 7, 2019, now Pat. No. 10,756,522.

(60) Provisional application No. 62/667,752, filed on May 7, 2018.

(51) Int. Cl.
| | | |
|---|---|---|
| *H02G 3/08* | (2006.01) | |
| *H01R 25/00* | (2006.01) | |
| *H02G 3/14* | (2006.01) | |

(52) U.S. Cl.
CPC .......... *H02G 3/081* (2013.01); *H01R 25/006* (2013.01); *H02G 3/14* (2013.01)

(58) Field of Classification Search
CPC .................................................. H02G 3/081
USPC ....................................................... 174/560
See application file for complete search history.

(56) References Cited

U.S. PATENT DOCUMENTS

| | | | | |
|---|---|---|---|---|
| 3,573,344 A | * | 4/1971 | Snyder | H02G 3/086 |
| | | | | 174/57 |
| 6,956,172 B2 | | 10/2005 | Dinh | |
| 8,076,578 B1 | * | 12/2011 | Gretz | H02G 3/126 |
| | | | | 174/57 |
| 8,633,384 B1 | | 1/2014 | Shotey et al. | |
| 9,270,099 B1 | * | 2/2016 | Anshu | H02G 3/10 |
| 9,414,142 B1 | * | 8/2016 | Zauhar | H04R 1/025 |
| 10,756,522 B2 | | 8/2020 | Losaw | |
| 2004/0045960 A1 | * | 3/2004 | Rose | H02G 3/083 |
| | | | | 220/3.9 |
| 2005/0051546 A1 | | 3/2005 | Dihn | |
| 2009/0107693 A1 | * | 4/2009 | Meyer | H02G 3/086 |
| | | | | 174/60 |
| 2010/0084155 A1 | * | 4/2010 | Jafari | H02G 3/123 |
| | | | | 174/58 |
| 2010/0252552 A1 | * | 10/2010 | Nikayin | H02G 3/123 |
| | | | | 220/3.7 |
| 2010/0288554 A1 | * | 11/2010 | Jafari | H02G 3/126 |
| | | | | 174/545 |
| 2016/0172831 A1 | | 6/2016 | Korcz | |
| 2019/0150299 A1 | * | 5/2019 | Naohara | H05K 1/09 |
| | | | | 361/749 |
| 2019/0305537 A1 | * | 10/2019 | Liubakka | H02G 3/0456 |
| 2020/0067296 A1 | * | 2/2020 | Howard | H02G 3/10 |

* cited by examiner

*Primary Examiner* — Stanley Tso
(74) *Attorney, Agent, or Firm* — FisherBroyles, LLP; Craig W. Mueller (57) ABSTRACT

An adjustable junction box is provided that allows a technician to selectively adjust the distance between an outer surface of the junction box and an outer surface of a stud to which the junction box is interconnected. A selectively-removable cover is also provided that allows an outlet, for example, to be interconnected to a power supply and later removed for inspection.

14 Claims, 8 Drawing Sheets

SELECTIVELY ADJUSTABLE JUNCTION BOX

This application is a divisional of U.S. patent application Ser. No. 16/405,292, filed May 7, 2019, which claims the benefit of U.S. Provisional Patent Application No. 62/667,752, filed May 7, 2018, the entireties of which are incorporated by reference herein.

FIELD OF THE INVENTION

Embodiments of the present invention are generally directed to a junction box that accommodates an electrical device such as an outlet, switch, media connector, telecommunications connector, etc. The electrical device is interconnected to a selectively removable cover associated with an outer opening of the junction box. The junction box of one embodiment of the present invention is adjustable relative to a wall to which the junction box is installed.

BACKGROUND OF THE INVENTION

Electrical wires connected to electrical devices (i.e., outlets and switches) found in dwellings and office buildings terminate or meet in junction boxes. Junction box location is strictly controlled by building codes. The number and quality of wires extending into a junction box is also verified by building inspectors.

Normal installation entails interconnecting the junction box to a wooden or metal stud. Wires are then brought to the junction box and capped. A "rough-in" inspection is often performed next where the inspector verifies proper junction box location and the presence of wires required.

Eventually an internal building surface, i.e., drywall, is added to the stud. As one of ordinary skill in the art will appreciate, this process is messy and drywall joint compound, which is often referred to as "mud," often enters the junction box. Drywall mud can contact wires and, as it hardens, will cause the wires to lose resiliency which makes it difficult to later install the electrical device. The wire ends can also be compromised, wherein cleaning or trimming may be required so that they can interface with the electrical device. Furthermore, junction boxes usually include bosses that accommodate screws used to interconnect the electrical device to the junction box. The bosses can also be filled with mud, thereby making it difficult to later interconnect the outlet or switch.

After installation, the edge of the junction box may not be flush with the internal building surface, which may make it difficult to install finish plates onto the electrical device. Those of ordinary skill in the art will also appreciate that alignment mismatches often require longer fasteners, which often do not come with the finish plates, to connect the electrical device to the junction box. If the junction box extends past the interior building surface, there may be a gap between the edge of the interior building surface and the finish plate which is not aesthetic and must be addressed.

After these common installation issues are addressed, the electrical device is interconnected to the junction box and the inspector will be invited to re-inspect the electrical system to ensure all outlets and switches work properly.

Accordingly, it is a long felt need to provide a junction box that facilitates interconnection of the electric device, allows realignment relative to the building surface if required, expedites installation, and expedites inspection.

SUMMARY OF THE INVENTION

It is one aspect of some embodiments of the present invention to provide a junction box with a removable cover. The cover is selectively interconnected to the junction box, which may be fixedly or adjustably interconnected to a wall stud. The cover receives and secures an electrical device so that it can be removed from the junction box with the cover if necessary. This feature allows for the majority of electrical outlet/switch insulation to occur at the rough-in stage (i.e., a one-step installation procedure), which drastically reduces overall installation time. The cover can be easily removed from the junction box to allow the inspector to review the integrity of the electrical interconnections. A shield may be placed over the outlet or switch to prevent common construction debris from damaging the electrical device. After power is delivered to the outlet or switch, the inspector will again test the functionality of the electronic component. A faceplate is installed before or after final inspection to complete installation. This aspect of one embodiment of the present invention, thus, removes one step from the installation process.

In one embodiment of the present invention, the cover includes protrusions or arms that end in fingers that selectively interconnect to the junction box. The fingers may selectively engage openings in an upper and lower portion of the junction box. One of ordinary skill in the art will appreciate that the opening may be found on the lateral sides of the box. A passage is provided that allows one to insert a tool to selectively deflected arms, thereby removing the fingers from the openings and allowing cover removal.

In operation, wherein the following order is not important, the electrical device is interconnected to the cover. Next, wires are interconnected to the electrical device and shield is interconnected to at least one of the electrical device and cover. At the rough in stage, the inspector can review the interconnection of the wires to the electrical device as the cover can be selectively removed from the junction box, or the outlet/cover is made to hang from the junction box. The cover is then reconnected to the junction box and internal building surface, i.e., drywall, is interconnected to the studs. The cover (with interconnected electrical device and shield, if desired) can be reinstalled on the junction box before wall painting or texturing. The final step comprises interconnecting a faceplate to the outlet or switch in the traditional fashion.

It is another aspect of some embodiments of the present invention to provide an adjustable junction box. As discussed above, often the position of the junction box relative to the internal building service is not ideal, wherein the junction box must be moved into or out of the wall, a difficult and time-consuming task. This task may also require that portions of the drywall be removed and may elicit a further inspection, which is not ideal. In one embodiment, a bracket comprised of a plate having outwardly extending abutments is interconnected to the stud. The abutments slidingly receive protrusions extending from an upper and lower surface of the junction box. Thus, the junction box is supported by the abutments, which prevents movement along the length of the stud. The bracket also has a plurality of grooves, slots, or other indentations that receive a locking member operably associated with the junction box. The locking member of one embodiment of the present invention is a captured worm screw with threads that selectively interface with the brackets/grooves/slots. Rotating the worm screw will move the junction box into and out of the wall.

The locking member of another embodiment of the present invention is a selectively deflectable tab that extends from the outer surface of the junction box. In one embodiment, the member is similar to a leaf spring with the first end interconnected to an inner surface of the junction box and a second end that extends through the junction box that is adapted to fit within one of the grooves or slots provided by the bracket. The member can be removed from the groove/slot by deflecting it with a tool that engages and moves the second end.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

The following component list and associated numbering found in the drawings is provided to assist in the understanding of one embodiment of the present invention:

| # | Component |
|---|---|
| 2 | Adjustable junction box system |
| 6 | Worm screw |
| 10 | Junction box |
| 14 | Outlet |
| 18 | Channel |
| 22 | Bracket |
| 24 | Anchor point |
| 26 | Retainer |
| 30 | Upper end |
| 34 | Ledge |
| 38 | Lower end |
| 42 | Upper tab |
| 46 | Opening |
| 50 | Threads |
| 54 | Cover |
| 58 | Arm |
| 62 | Finger |
| 66 | Opening |
| 70 | Upper surface |
| 74 | Lower surface |
| 78 | Aperture |
| 82 | Front face |
| 86 | Passage |
| 202 | Adjustable junction box system |
| 207 | Clip |
| 209 | First end |
| 210 | Junction box |
| 213 | Inner surface |
| 217 | Second end |
| 218 | Slot |
| 221 | Groove |
| 222 | Bracket |
| 226 | Retainer |
| 234 | Ledge |
| 242 | Upper tab |
| 246 | Opening |
| 254 | Cover |
| 258 | Arm |
| 262 | Finger |
| 266 | Opening |
| 270 | Upper surface |
| 278 | Aperture |
| 302 | Adjustable junction box system |
| 306 | Standoff |
| 309 | Nut plate |
| 310 | Junction box |
| 354 | Cover |
| 402 | Adjustable junction box system |
| 406 | Teeth |
| 409 | Protrusion |
| 410 | Junction box |
| 454 | Cover |
| 458 | Arm |
| 502 | Adjustable junction box system |
| 506 | Junction box housing |
| 509 | Wheel |
| 510 | Junction box |
| 602 | Adjustable junction box system |
| 606 | Adjustable collar |
| 609 | Housing |
| 611 | Adjustable screw |
| 654 | Cover |
| 658 | Arm |
| 662 | Finger |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 1-5 show the adjustable junction box system 2 of one embodiment of the present invention that employs a captured worm screw 6. Rotation of the worm screw 6 inclemently moves a junction box 10 into a wall (along the direction of Arrow A) or out of the wall (along Arrow B). The junction box 10 is of a configuration similar to traditional boxes that receive an electrical device, in this example an outlet 14. Those of ordinary skill in the art will appreciate, however, that the junction box 14 may be of any size and shape and may be designed to accommodate multiple electrical devices. The junction box 10 has a channel 18 that maintains the worm screw 6.

In operation, the junction box 10 is interconnected to a bracket 22 having a retainer 26 at an upper end 30 and a ledge 34 at a lower end 38. The retainer 26 receives an upper tab 42 extending from an upper surface 70 of the junction box 10, and the ledge 35 receives a complementary tab (not shown) extending from a lower surface of the junction box 10. The interface between the tabs and the retainer/ledge allows the junction box to move into and out the wall, but prevents movement of the junction box along the length of the stud. The bracket 22 also includes a series of openings 46 that selectively engage threads 50 of the worm screw 6. In operation, rotation of the captured worm screw 6 incrementally moves the interconnected junction box 10 into and out of the wall.

Anchor points 24 on the bracket 22 are adapted to receive screws or nails for interconnection to a stud. One of ordinary skill in the art will appreciate that at least one of these anchor points 24 may be a slot or an arcuate slot that allows for selective rotation of the bracket to address angular (i.e., non-plumb) stud irregularities.

The junction box 10 selectively receives a cover 54 with upper and lower arms 58. The arms end 58 in upper and lower fingers 62 that are selectively received within openings 66 in the upper surface 70 and the lower surface 74 of the junction box 10. Apertures 78 are provided in a front face 82 of the cover 54 that allows selective access to an end of the worm screw 6, which allows a technician to rotate the worm screw 6. Apertures 78 may be provided on both sides of the cover 54 such that cover orientation relative to the junction box 10 is irrelevant. Passages 86 are provided within the cover that allow a technician to insert a tool, such as a flathead screwdriver, into a closed junction box 10 to selectively deflect the fingers 62 from the openings and remove the cover 54 from the junction box 10.

Figure 1:
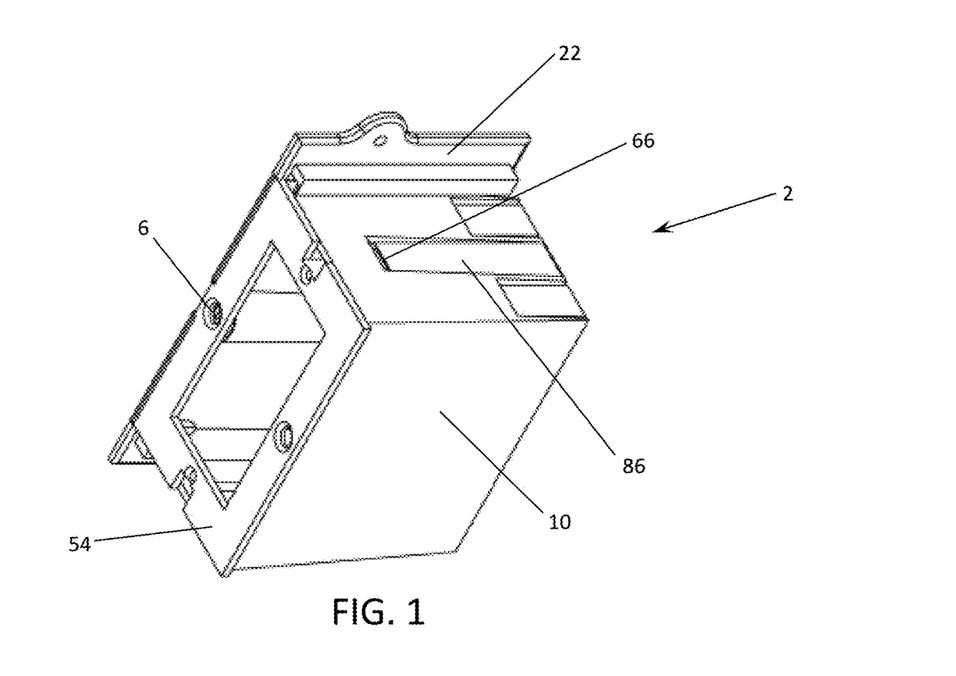
FIG. 1 is a perspective view of the adjustable junction box system of one embodiment of the present invention.
Figure 2:
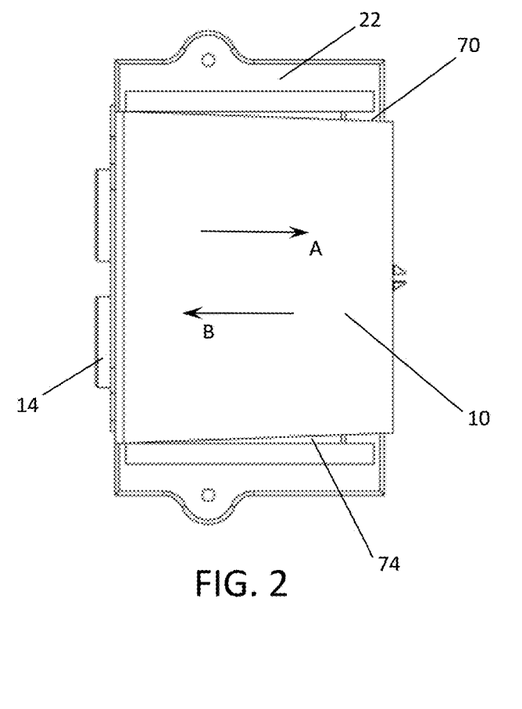
FIG. 2 is a right elevation view of FIG. 1.
Figure 3:
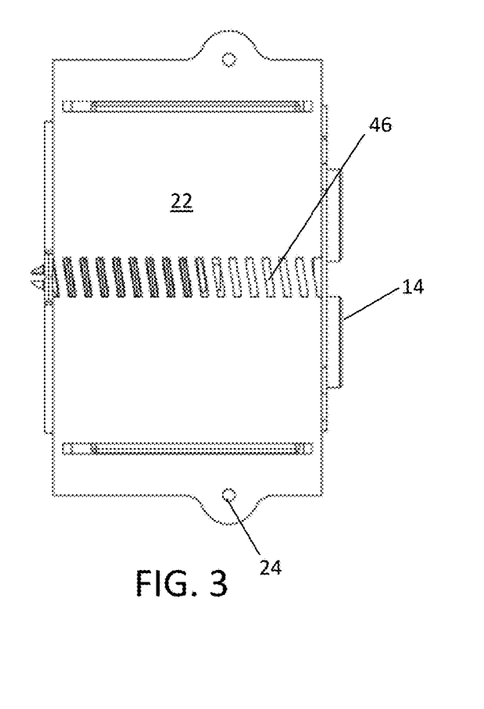
FIG. 3 is a left elevation view of FIG. 1.
Figure 4:
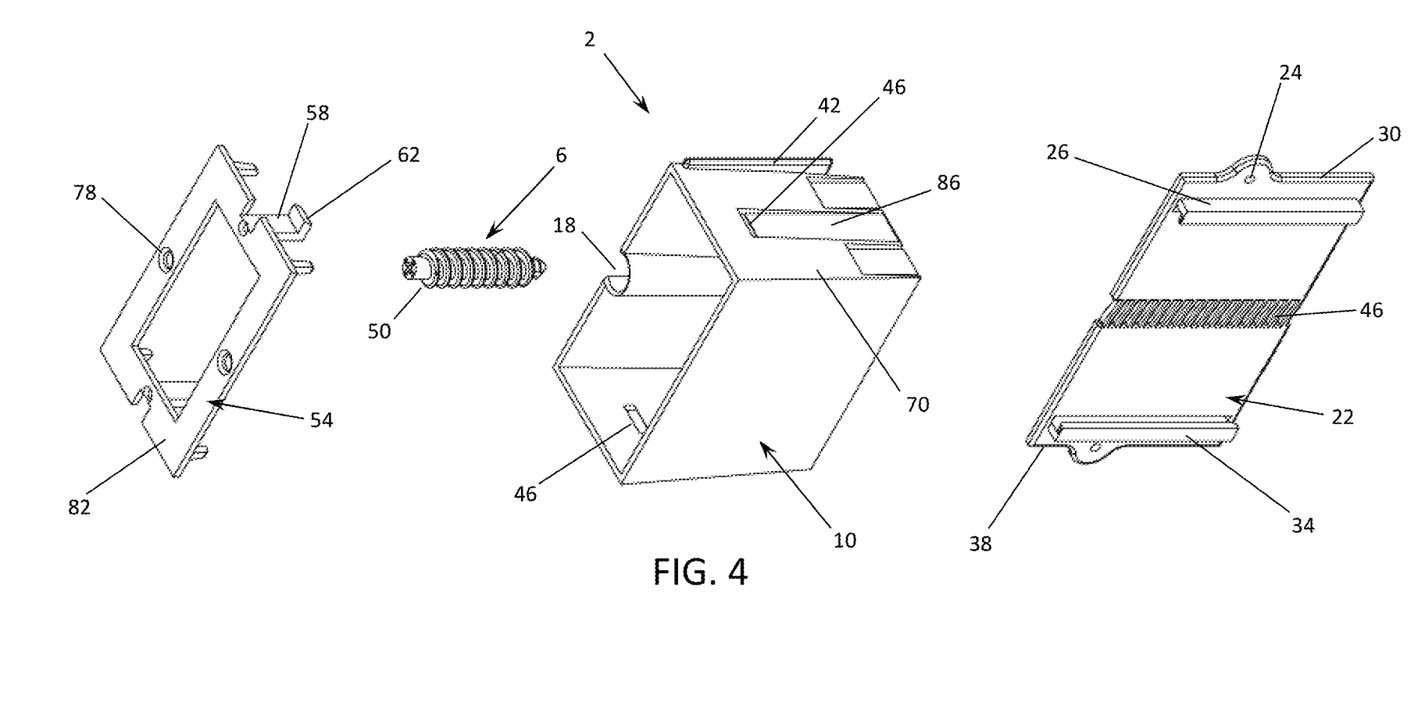
FIG. 4 is an exploded perspective view of the embodiment of the present invention shown in FIG. 1.
Figure 5:
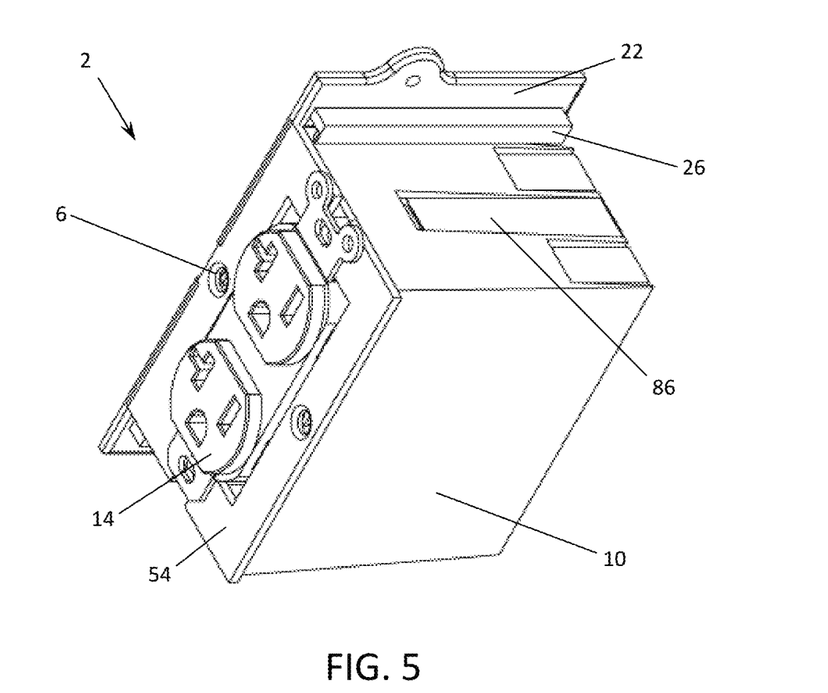
FIG. 5 is a perspective view of the embodiment of FIG. 1 shown with an outlet interconnected thereto.
Figure 6:
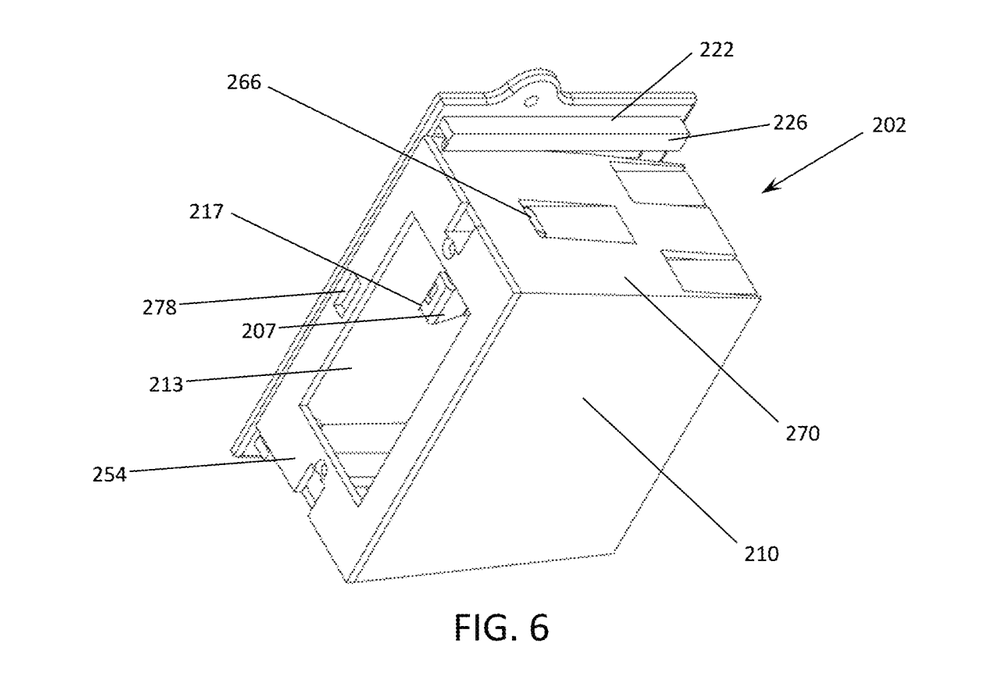
FIG. 6 is a perspective view of another embodiment of the present invention.
Figure 7:
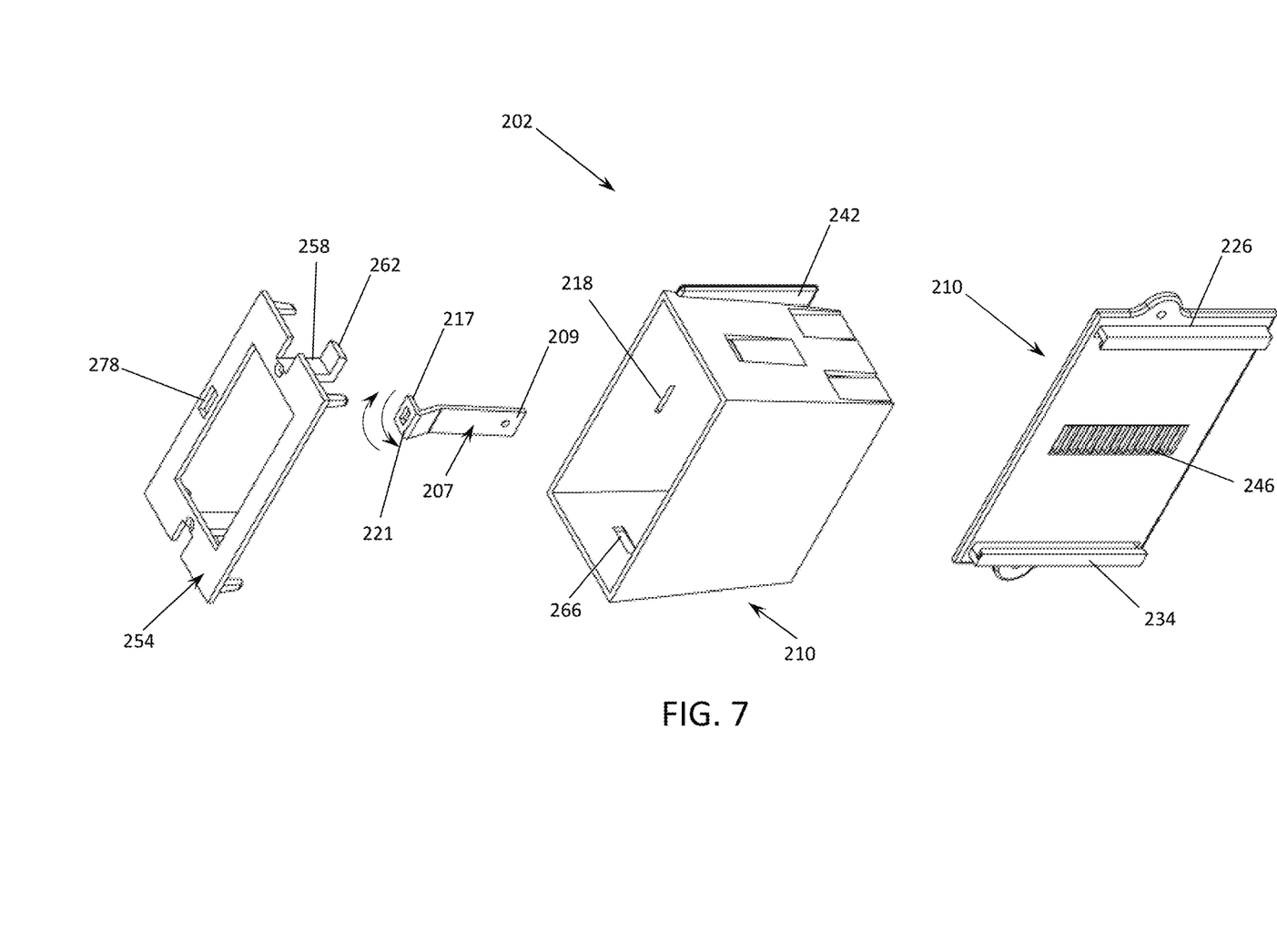
FIG. 7 is an exploded perspective view of the embodiment of the present invention shown in FIG. 6.

FIGS. 6 and 7 show another embodiment of an adjustable junction box system 202 that employs a junction box 210 that selectively interfaces with a bracket 222. As in the embodiments described above, the junction box 210 in this embodiment includes an upper tab and a lower tab (not shown) that selectively engage a retainer 226 and ledge 234, respectively, provided in the bracket 222. The primary difference to that a selectively deflectable clip 207 is provided instead of a worm screw.

More specifically, the clip 207 is interconnected on a first end 209 to an inner surface 213 of the junction box 210. One of ordinary skill in the art will also appreciate that the first end 209 can be interconnected to the outer surface of the junction box. A second end 217 of the clip 207 extends through a slot 218 in the outer surface of the junction box and is designed to flex to be received by one of the openings 246 in the bracket 222. A small opening or groove 221 in the clip 207 may be provided, wherein an aperture 278 in a selectively-interconnectable cover 254 allows for insertion of a tool to flex the second end 217 of the clip 207 to remove it from the bracket opening 246, which allows the junction box 210 to incrementally slide into or out of the wall. The cover of this embodiment of the present invention is very similar to that described above wherein arms 258 are provided that end in fingers 262 that are selectively received in openings 266 in the upper surface 270 and lower surface 274 of the junction box 210.

Figure 8:
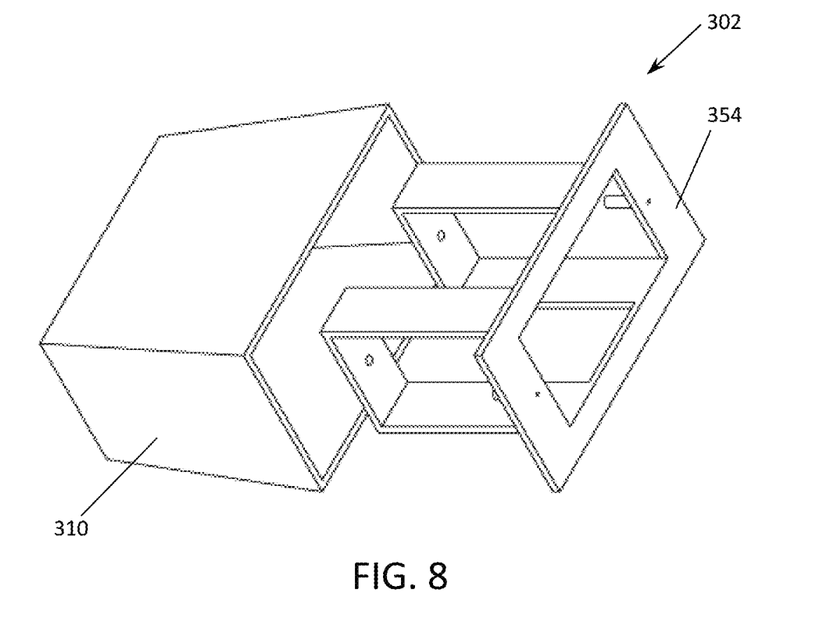
FIG. 8 is a perspective view of another embodiment of the present invention.
Figure 9:
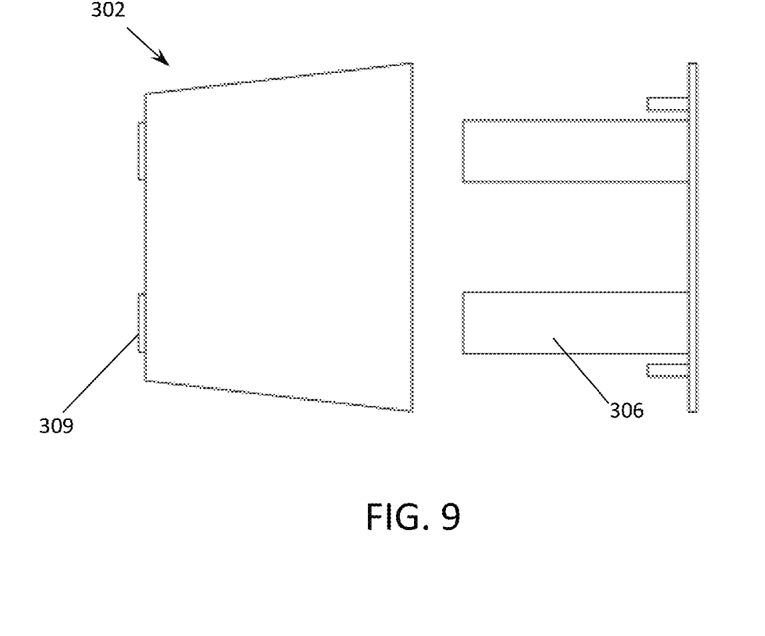
FIG. 9 is a left elevation view of FIG. 8.

FIGS. 8 and 9 show another embodiment of the present invention that uses a cover 354 having plurality standoffs 306 that selectively interconnect to nut plates 309 integrated into a rear surface of the junction box 310. The cover 354 also is adapted to receive and secure an outlet or switch.

Figure 10:
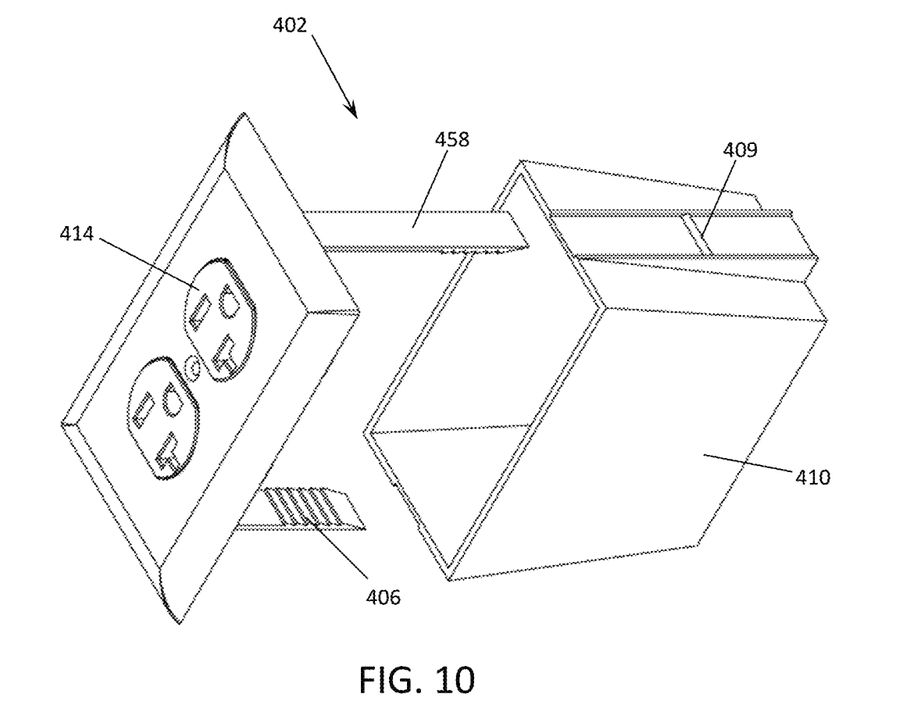
FIG. 10 is a perspective view of another embodiment of the present invention.
Figure 11:
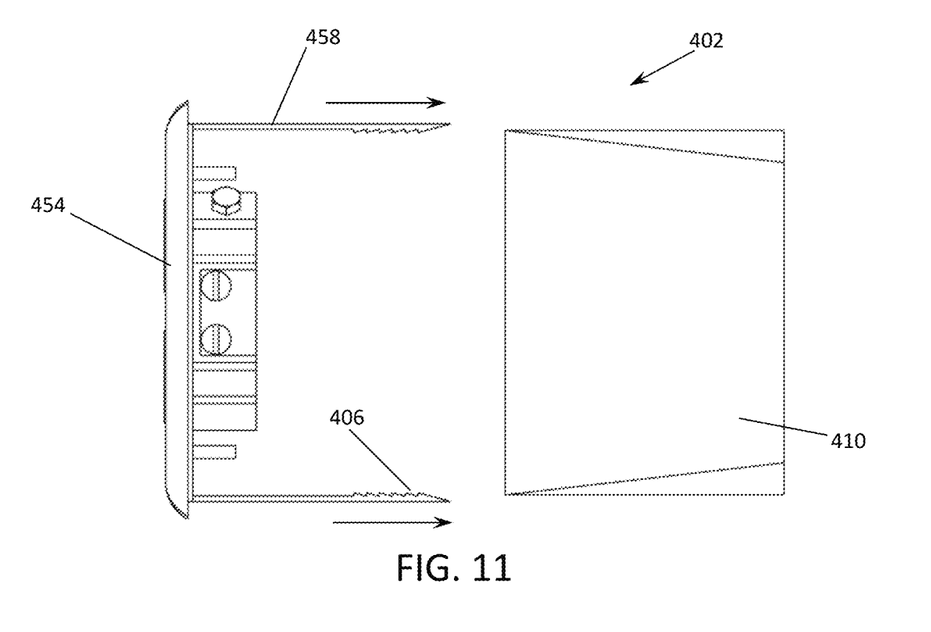
FIG. 11 is a right elevation view of FIG. 8.

FIGS. 10 and 11 show yet another embodiment of the present invention where the cover 454 employs arms 458 that extends from the back surface. The arms 458 employ a plurality of teeth 406 that selectively engage protrusions 409 provided in the upper and lower surfaces of the junction box 410. The arms 458 are flexed outwardly to remove the teeth 406 from the protrusion 409 which allows for selective adjustment or removal of the cover 454. That is, the cover and interconnected electrical device can be spaced as needed to accommodate interior surface installation.

Figure 12:
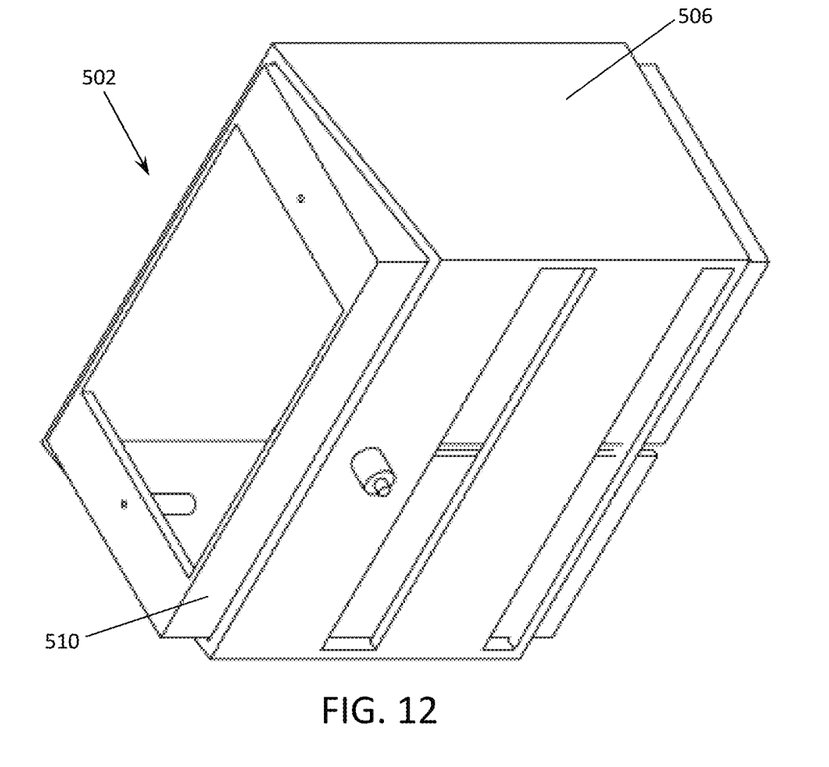
FIG. 12 is a perspective view of another embodiment of the present invention.
Figure 13:
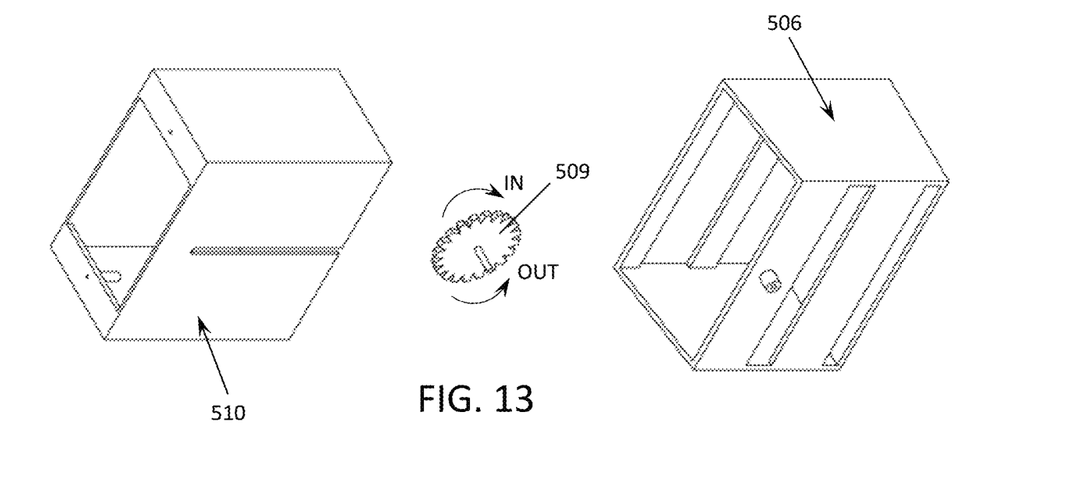
FIG. 13 is an exploded perspective view of the embodiment of the present invention shown in FIG. 12.

FIGS. 12 and 13 show another embodiment of the present invention comprised of a junction box housing 506 that receives a junction box 510. The junction box housing 506 is interconnected to a wall stud and the junction box 510 is selectively received within the junction box housing 506. Here, an adjustment wheel 509 is provided that when rotated in one direction moves the junction box 510 into the junction box housing 506. Rotation of the adjustment wheel 509 in the opposite direction will urge the junction box 510 and interconnected outlet from the wall.

Figure 14:
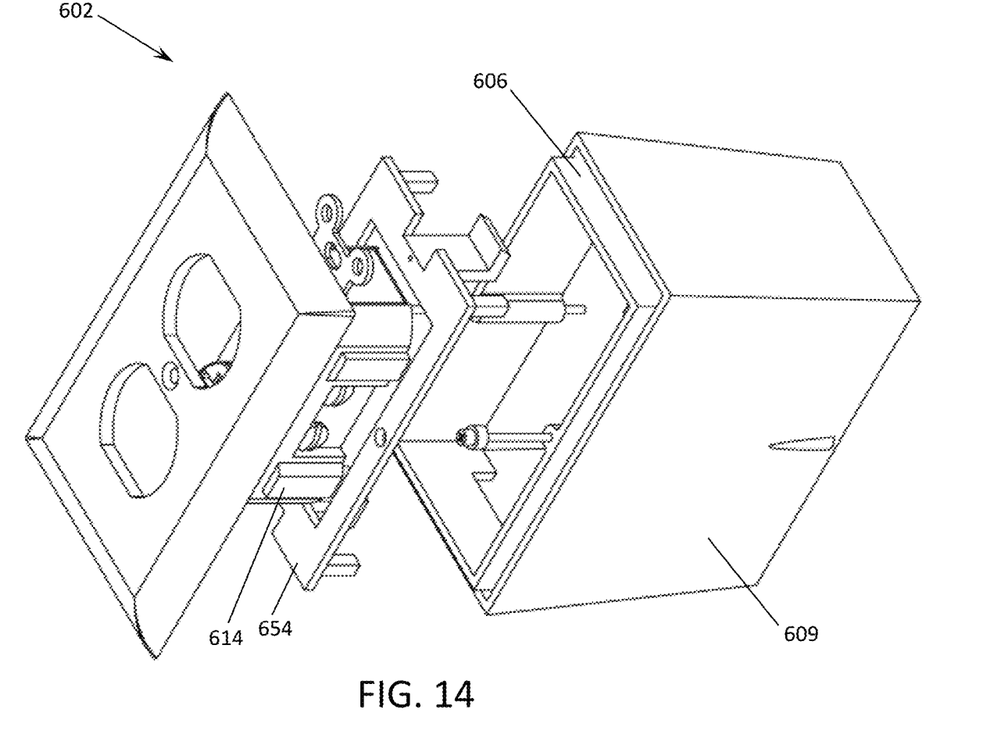
FIG. 14 is an exploded right elevation view of another embodiment of the present invention.
Figure 15:
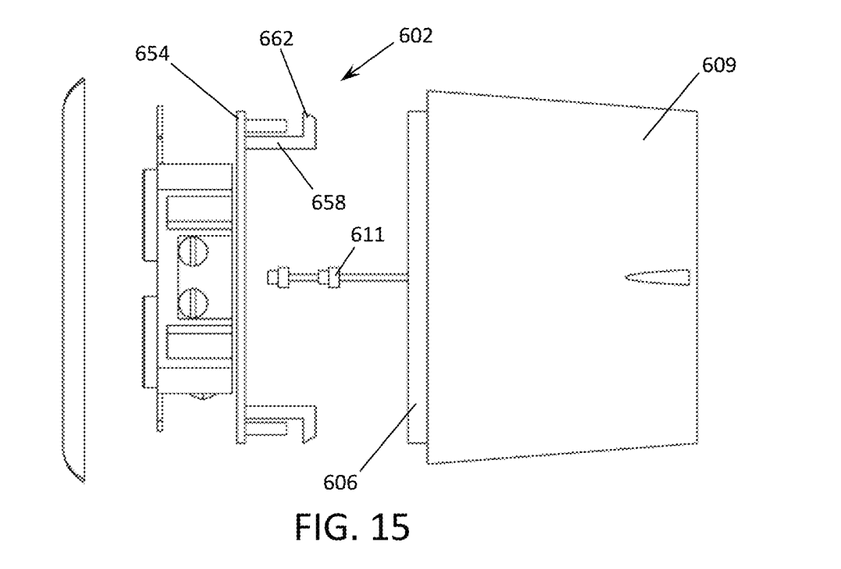
FIG. 15 is a right elevation view of the embodiment of the present invention shown in FIG. 14.

FIGS. 14 and 15 show another embodiment of the present invention that uses an adjustable collar 606 interconnected to a junction box housing 609 by a plurality of adjustable screws 611. The junction box housing 609 is interconnected to a stud. Movement of the adjustment screws 611 will selectively move the collar 606 into and out of the junction box housing 609. The collar 606 is also configured to selectively receive a cover 654 that accommodates an outlet 614. The cover may include arms 658 ending in fingers 662 that are received in openings in the adjustable collar 606.

While various embodiments of the present invention have been described in detail, it is apparent that modifications and alterations of those embodiments will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. An adjustable junction box system, comprising:
   a bracket having an outer face adapted for interconnection to a stud and an opposing inner face,
   a first end associated with a retainer and a second end associated with a ledge,
   and a plurality of openings extending through the bracket from the inner face to the outer face,
   the plurality of openings positioned between the retainer and the ledge and extending at least a portion of the distance between an outer edge and an inner edge of the bracket; and
   a junction box comprised of a top surface,
   a bottom surface,
   a left lateral surface,
   and a right lateral surface,
   the junction box further comprising:
      an upper tab extending from the top surface,
      the upper tab configured to fit within and operatively interface with the retainer,
      a lower tab extending from the bottom surface,
      the lower tab configured to operatively interface with the ledge, and
      a deflectable clip with a first end interconnected to an inner face of the left lateral surface or an inner face of the right lateral surface and a second end configured for selective engagement within one of the plurality of openings,
      wherein the second end is positioned through an opening in the left lateral surface or the right lateral surface.

2. The adjustable junction box system of claim 1, wherein the second end of the deflectable clip includes an opening or a groove configured to receive a tool.

3. The adjustable junction box system of claim 1, further comprising:
   a cover configured to selectively interconnect to the top surface, the bottom surface, the left lateral surface, and the right lateral surface; and
   wherein the cover is also configured to secure an electrical device.

4. The junction box of claim 3, wherein the cover includes a first inwardly extending arm that ends in a first finger and a second inwardly extending arm that ends in a second finger,
   wherein the first finger is configured to be received within an opening in the top surface, and wherein the second finger is configured to be received within an opening in the bottom surface.

5. The adjustable junction box system of claim 3, wherein the second end of the deflectable clip includes an opening or a groove configured to receive a tool,
   and wherein the cover includes an aperture that communicates with the opening or groove of the deflectable clip.

6. An adjustable junction box system, comprising:
   a top surface;
   a bottom surface;
   a left lateral surface;
   a right lateral surface;
   a cover adapted to secure an electrical device and configured to selectively associate with outer edges of the top surface, the bottom surface, the left lateral surface, and the right lateral surface;
   a first tab associated with the top surface and a second tab associated with the bottom surface;
   a bracket adapted for interconnection to a wall stud,
   the bracket having an upper retainer for operative receipt of the first tab,
   and a lower ledge for operative receipt of the second tab,
   and wherein the bracket includes a plurality of openings or cavities extending therethrough,
   and which are located between the upper retainer and the lower ledge; and
   a deflectable clip with a first end interconnected to an inner face of the left lateral surface or an inner face of the right lateral surface and a second end configured for selective engagement within one of the plurality of openings or cavities,
   wherein the second end is positioned through an opening in the left lateral surface or the right lateral surface.

7. The adjustable junction box system of claim 6, wherein the second end of the deflectable clip includes an opening or a groove configured to receive a tool.

8. The junction box of claim 6, wherein the cover includes a first inwardly extending arm that ends in a first finger and a second inwardly extending arm that ends in a second finger,
   wherein the first finger is configured to be received within an opening in the top surface, and wherein the second finger is configured to be received within an opening in the bottom surface.

9. The adjustable junction box system of claim 6, wherein the second end of the deflectable clip includes an opening or a groove configured to receive a tool,
   and wherein the cover includes an aperture that communicates with the opening or groove of the deflectable clip.

10. A junction box, comprising:
    a top surface;
    a bottom surface;
    a left lateral surface;
    a right lateral surface;
    a rear surface;
    a first protrusion associated with the top surface and a second protrusion associated with the bottom surface;
    a bracket adapted for interconnection to a wall stud,
    the bracket having an upper channel for operative receipt of the first protrusion and a lower channel for operative receipt of the second protrusion,
    wherein the bracket includes a plurality of receptacles extending therethrough located between the upper channel and the lower channel; and
    a deflectable clip with a first end interconnected to an inner face of the left lateral surface or an inner face of the right lateral surface and a second end configured for selective engagement within one of the plurality of receptacles,
    wherein the second end is positioned through an opening in the left lateral surface or the right lateral surface.

11. The adjustable junction box system of claim 10, wherein the second end of the deflectable clip includes an opening or a groove configured to receive a tool.

12. The junction box of claim 10, further comprising a cover configured to selectively interconnect to outer edges of the top surface, the bottom surface, the left lateral surface, and the right lateral surface; and
    wherein the cover is adapted to secure an electrical device.

13. The junction box of claim 12, wherein the cover includes a first inwardly extending arm that ends in a first finger and a second inwardly extending arm that ends in a second finger, wherein the first finger is configured to be received within an opening in the top surface, and wherein the second finger is configured to be received within an opening in the bottom surface.

14. The adjustable junction box system of claim 12, wherein the second end of the deflectable clip includes an opening or a groove configured to receive a tool, and wherein the cover includes an aperture that communicates with the opening or groove of the deflectable clip.

* * * * *